Nov. 16, 1948.  J. G. SCHMIDT  2,454,098
COLLET CHUCK
Filed Nov. 30, 1943   3 Sheets-Sheet 1
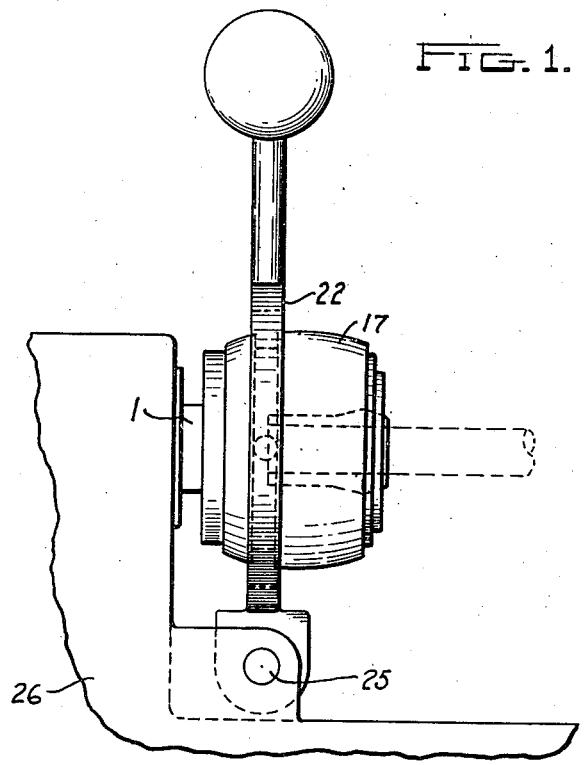
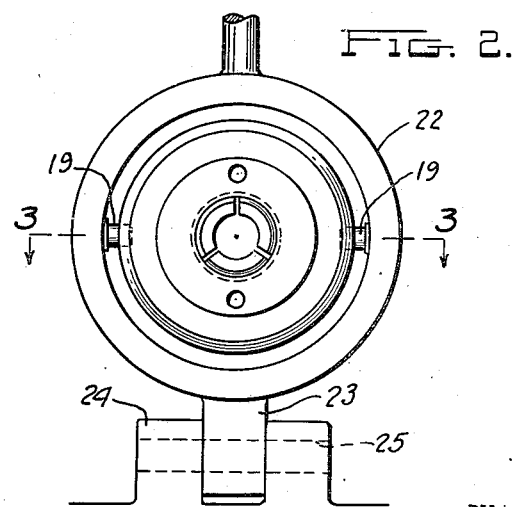
INVENTOR.
John G. Schmidt
BY
Barnes, Kisselle, Laughlin & Raisch
Attorneys Nov. 16, 1948.                J. G. SCHMIDT                2,454,098
                              COLLET CHUCK
Filed Nov. 30, 1943                              3 Sheets-Sheet 2
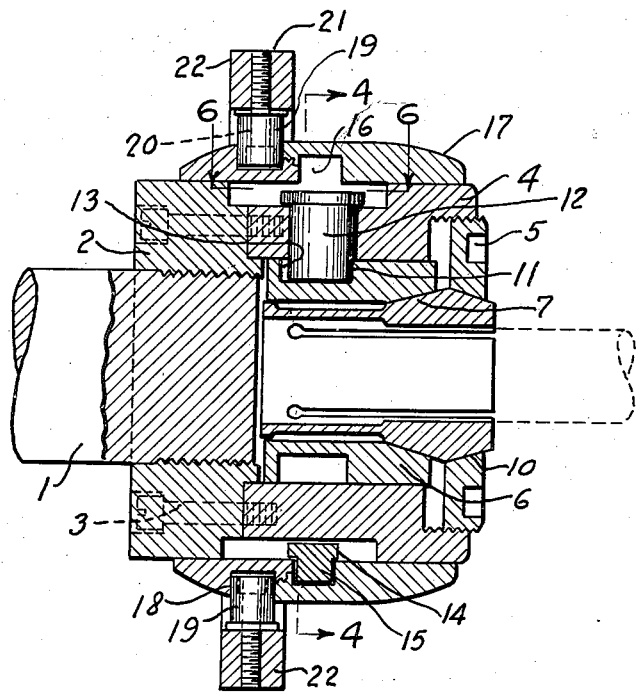
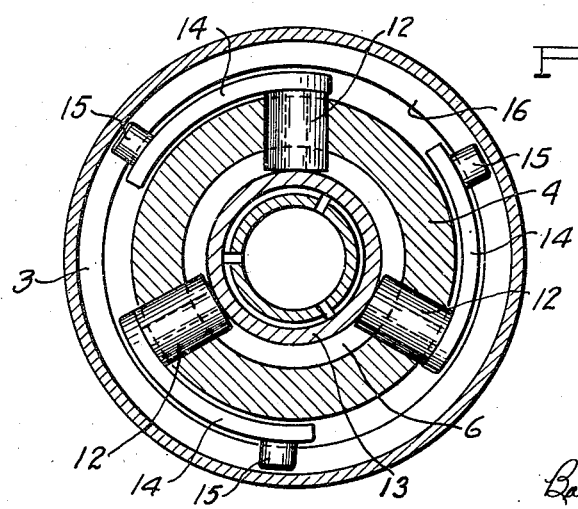
INVENTOR.
John G. Schmidt
BY
Barnes, Kisselle, Laughlin & Raisch
Attorneys Nov. 16, 1948.　　　　J. G. SCHMIDT　　　　2,454,098
COLLET CHUCK
Filed Nov. 30, 1943　　　　　　　　　　3 Sheets-Sheet 3
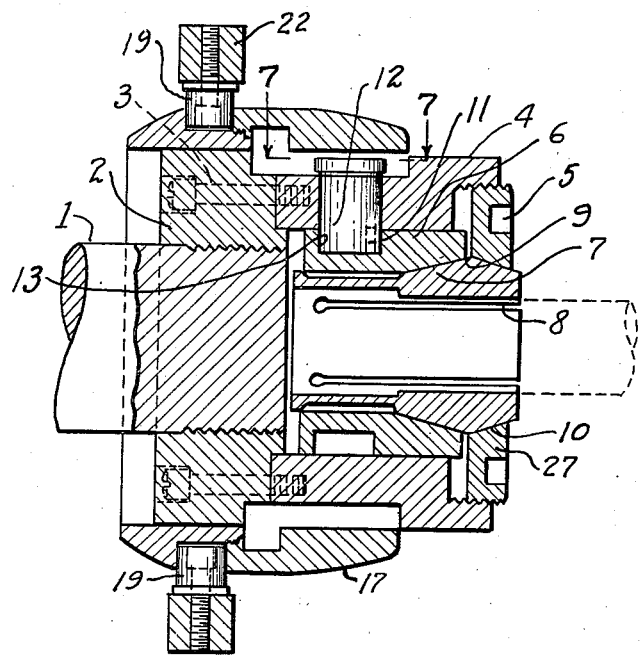
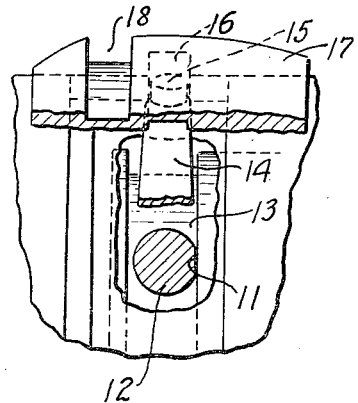
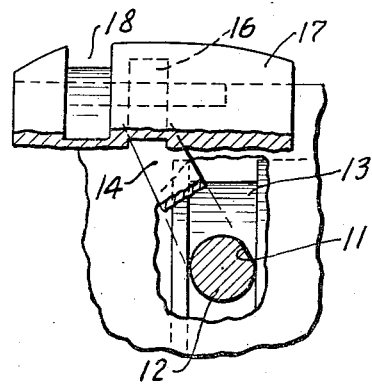
INVENTOR.
John G. Schmidt
BY
Barnes, Kisselle, Laughlin & Raisch
Attorneys Patented Nov. 16, 1948

2,454,098

UNITED STATES PATENT OFFICE 2,454,098

COLLET CHUCK

John G. Schmidt, Detroit, Mich., assignor to Arthur V. Whittington, Detroit, Mich.

Application November 30, 1943, Serial No. 512,356

11 Claims. (Cl. 279—50)

This invention relates to a collet chuck.

It is the object of the invention to provide a simple, effective chuck, particularly one for holding a piece of work, which can be operated simply by throwing a lever handle. The amount of opening of the chuck to receive the work can be easily adjusted by a spanner plug.

A further feature is that the chuck can be opened and closed while it is rotating.

Referring to the drawings:

Fig. 1 is a side elevation of the chuck arranged to be used on a lathe.

Fig. 2 is a front elevation of the same.

Fig. 3 is a cross-section on the line 3—3 of Fig. 2.

Fig. 4 is a cross-section on the line 4—4 of Fig. 3.

Fig. 5 is a longitudinal section through the chuck showing the tapered sleeve contracted by moving the sleeve and collar to the right, as compared with the position of the parts in Fig. 3.

Fig. 6 is a section on the line 6—6 of Fig. 3.

Fig. 7 is a similar view showing the parts after the lever has been thrown to lock the clutch upon the work.

1 designates the arbor of the machine on which is screwed a large, heavy collar 2. Fastened to this by countersunk bolts 3 is a housing ring 4 and screwed into the end of this is a threaded plug 27, having recesses 5 to take a spanner wrench. Slidably fitted into the housing ring is a sleeve 6 having a central opening with a tapered end 7. A spring split-sleeve 8 fits into the central opening of the sleeve 6 and has a tapered external surface 9 that fits into the conical opening 7 in the end of the sleeve 6. A second tapered external surface 10 fits into the conical opening in the threaded plug. By sliding sleeve 6 back and forth in the housing ring and over the tapered surface 9 of the slotted sleeve 8, the grip on the work is either released or obtained. In the position of the parts shown in Fig. 5 the slotted sleeve is expanded and does not grip the work for the reason that the flat 11 of cam 12 is bearing against the wall of the annular groove 13 in the sleeve 6. This is the position of the parts shown in Fig. 7. When this cam is shifted clockwise from the position shown in Fig. 6 to that shown in Fig. 7, it serves to thrust the split sleeve 6 to the right in Fig. 5 and this conical surface 7 rides up the conical surface 9 on the split sleeve 8 and contracts that sleeve upon the work.

There are three of these cams 12, as will be seen by consulting Fig. 4. Each cam is rotatably supported in the housing ring 4 and is carried on the end of an arcuate arm 14. At the free or swinging end of this arm is a pin 15 which rides in the annular groove 16 in the interior face of the sliding collar 17 which rides back and forth on the exterior of collar 2 and housing ring 4. This sliding collar is made up of two sections that are screwed together, as shown in the drawings. There is an external annular groove 18. In this groove engage a pair of rollers 19 which freely rotate on the studs 20 at the end of the screw 21. These rollers are carried on the ring 22 which has at the one side or the bottom an ear or knuckle 23 which is secured between the knuckles 24 by means of the pintle 25. These knuckles 24 are secured on the bed 26 of the machine; for instance, a lathe. This ring can be thrown to the right in Fig. 1 (clockwise). This serves to throw the sliding collar 17 to the right from the position shown to that in Fig. 6. This throws the three arcuate arms 14 clockwise (see Figs. 6 and 7) and from the position shown in Fig. 6, thus bringing the high point of the cam against the right wall of the groove 13 thereby moving the sliding sleeve 6 to the right and causing the conical or tapered surface 7 to slide up the tapered exterior surface 9 of the split sleeve 8 and thereby contract the sleeve upon the work and grip it. To release the work just the opposite throw is given to the lever arm and the ring 22.

The amount of opening of the gripping sleeve 8 when the parts have released is determined by the adjustment of the threaded plug 27. The further out this plug is screwed the greater the opening of the spring sleeve.

This makes a very effective collet type of chuck which is simple in construction and number of parts and which is given a maximum throw with a minimum movement of the lever arm. By providing a plurality of cams and cam operating arms or levers distributed at equidistant points around the ring the thrust is evenly distributed and there is no tendency of the parts to cramp.

What I claim is:

1. A collet chuck having in combination a housing ring, a sleeve slidable therein, one or more cams each provided with an arm and journalled in the housing ring to turn on a radial axis for causing the sleeve to slide therein when the cam is operated, a split spring sleeve in relation to which the sliding sleeve moves and which is thereby caused to engage the work or be released from the work, an internally and annularly grooved collar on the outside of the housing for controlling the operation of the one or more cams by turning the cam arm which engages in said groove and means on the outside of the collar having a rotative relation with the collar for causing the collar to operate the cams to grip or release the work.

2. The combination claimed in claim 1 in which the means on the outside of the collar is a lever member which is arranged in relative rotative relation with the collar by which the lever can be thrown to slide the collar to operate the cam or cams to cause sliding of the sleeve and thereby distort the split sleeve to grip the work or the release of the split sleeve to release the work.

3. The combination claimed in claim 1 in which the collar is slidable and provided with an annular groove in its external surface and the means on the outside of the collar is a combined lever and ring adapted to be hinged to the machine and provided with one or more rollers which engage the said sliding collar in the said annular groove.

4. The combination claimed in claim 1 and in which the sliding sleeve has a central opening with a flared conical end and in which the split sleeve fits into the opening and has a flared, thickened conical outside surface that fits into the conical internal surface of the said sliding sleeve whereby longitudinal movement of the sliding sleeve and the two engaging conical surfaces either causes contraction of the split sleeve to grip the work or allows expansion of the split spring sleeve to release the work.

5. The combination claimed in claim 1 in which the split sleeve is provided with a tapered or conical external surface directed outwardly of the end of the sleeve and in which a threaded plug is screwed into the end of the casing and is provided with a conical central opening cooperating with the last mentioned tapered or conical surface of the split sleeve to adjustably limit the outward opening of the sleeve.

6. A collet chuck having in combination a housing ring, a sleeve slidable therein, one or more cams supported in the housing for causing the sleeve to slide therein when the cam is operated, a split spring sleeve over which the sliding sleeve moves and which is thereby caused to contract upon the work or be released from the work, means on the outside of the casing for controlling the operation of the one or more cams and a second means on the outside of the first means having a rotative relation with the first means for causing the first means to operate the cams to grip or release the work, the said first mentioned means being a sliding collar having an internal and annular groove, and said cam or cams having cylindrical members journalled in the housing ring, and each having an arcuate arm having a stud-like projection on the end engaged in the annular groove on the inside of the sliding collar.

7. A collet chuck having in combination a housing ring, a sleeve slidable therein, one or more cams supported in the housing for causing the sleeve to slide therein when the cam is operated, a split spring sleeve over which the sliding sleeve moves and which is thereby caused to contract upon the work or be released from the work, means on the outside of the casing for controlling the operation of the one or more cams and a second means on the outside of the first means having a rotative relation with the first means for causing the first means to operate the cams to grip or release the work, the cam or cams having each a cylindrical member journalled in the said housing ring and provided with an arcuate lever arm arranged to be engaged and operated by the said first mentioned means and each cam having an inwardly projecting flattened stud portion arranged to engage in an annular groove in the sliding sleeve.

8. A chuck comprising a tubular retainer adapted to be rigidly attached to a rotatable spindle, a collet mounted in said retainer, a collet actuating bushing mounted to slide axially on said collet, cams mounted to turn on radial axes in said retainer and having portions engageable with said bushing to move the same axially, a sleeve slidable axially upon said retainer, means operably connecting said sleeve to said cams to turn the same upon axial movements of said sleeve, and means for shifting said sleeve.

9. A chuck comprising a tubular retainer adapted to be rigidly attached to a rotatable spindle, a collet mounted in said retainer, a collet actuating bushing mounted to slide axially on said collet, cams mounted to turn on radial axes in said retainer and having portions engageable with said bushing to move the same axially, a sleeve slidable axially upon said retainer, means operably connecting said sleeve to said cams to turn the same upon axial movements of said sleeve, said sleeve having a circumferential external groove and a lever for shifting said sleeve provided with pins projecting into said groove.

10. A chuck comprising a housing ring, adapted to be rigidly attached to a rotatable spindle, a split spring sleeve mounted on said ring and having a tapered portion, a peripherally recessed sleeve guided in said housing ring to slide axially on said split sleeve, said slidable sleeve having a tapered portion engaging the tapered portion of the split sleeve to move portions of the same radially to grip an article, a cam having a journal portion rotatably supported to turn on a radial axis in said ring and having an actuating surface located on the inside of the ring and engaged in said peripheral recess of said sleeve and adapted to move the sleeve axially when the cam is rotated, an annularly and externally grooved and internally recessed collar slidable axially upon said ring, a lever arm secured to the journal portion of said cam and located on the outside of said ring, a pin secured on the free end of the lever arm and engageable in the internal recess of said collar to swing the lever arm and cam when the collar is moved axially on the housing ring, and manually operable means having a projection engaging in the annular external groove of the collar to move the sleeve axially of the retainer while the retainer is rotating or stationary.

11. A chuck comprising a tubular retainer adapted to be rigidly attached to a rotatable spindle, a collet having portions adapted to be moved radially to grip an article and a tapered surface on the side of the collet radially opposite the gripping side of the collet, a bushing provided with a circumferential groove and slidable in the retainer relative to the collet, said bushing having a tapered surface adapted to engage the tapered surface of the collet, a sleeve provided on the inside with a pin-receiving groove and slidable longitudinally of the retainer, said sleeve provided with an external annular groove, a cam rotatable on a radial axis in the retainer and having an actuating surface on the inside of the retainer adapted to contact a wall of the circumferential groove of the bushing to move the bushing longitudinally of the retainer, an arm on the outside of the tubular retainer attached to the cam to turn the same and provided with a pin on its free end adapted to engage in the pin-receiving groove of the collar to turn the arm and the cam when the collar is moved longitudinally of the retainer, and a pivoted hand lever having a projection engaging in the outer annular groove of the collar to move the same longitudinally of the retainer when the lever is swung on its pivot.

JOHN G. SCHMIDT.

REFERENCES CITED

The following references are of record in the file of this patent:

UNITED STATES PATENTS

| Number | Name | Date |
|---|---|---|
| 442,230 | Libby | Dec. 9, 1890 |
| 1,402,720 | Bartlett et al. | Jan. 3, 1922 |
| 2,335,721 | Zagar | Nov. 30, 1943 |